United States Patent
Reif et al.

(10) Patent No.: US 7,251,918 B2
(45) Date of Patent: Aug. 7, 2007

(54) FIXING BRACKET FOR JOINING WOODEN BUILDING COMPONENTS

(75) Inventors: Dieter Reif, Schlaitdorf (DE); Joachim Bader, Stuttgard (DE)

(73) Assignee: Braun & Würfele GmbH & Co., Baiersbronn (DE)

( * ) Notice: Subject to any disclaimer, the term of this patent is extended or adjusted under 35 U.S.C. 154(b) by 0 days.

(21) Appl. No.: 10/484,915

(22) PCT Filed: Jul. 10, 2002

(86) PCT No.: PCT/EP02/07667

§ 371 (c)(1),
(2), (4) Date: Jul. 7, 2004

(87) PCT Pub. No.: WO03/009138

PCT Pub. Date: Jan. 30, 2003

(65) Prior Publication Data

US 2004/0237463 A1   Dec. 2, 2004

(30) Foreign Application Priority Data

Jul. 16, 2001  (DE) ..................... 201 12 018 U

(51) Int. Cl.
*E04B 1/61*  (2006.01)
*E04F 15/02* (2006.01)
*E04F 13/10* (2006.01)

(52) U.S. Cl. .................... 52/714; 52/582.1; 52/715

(58) Field of Classification Search ............. 52/715, 52/712, 582.1, 404.4, 407.2–407.4, 489.2, 52/714; 24/910, 289, 570, 545, 563; 403/DIG. 15
See application file for complete search history.

(56) References Cited

U.S. PATENT DOCUMENTS

| 282,164 | A | * | 7/1883 | Chase | 52/509 |
|---|---|---|---|---|---|
| 407,376 | A | * | 7/1889 | Smith | 52/264 |
| 441,227 | A | * | 11/1890 | Cary | 217/70 |
| 876,399 | A | * | 1/1908 | Robinson | 52/714 |
| 924,355 | A | * | 6/1909 | Howard | 52/712 |
| 956,347 | A | * | 4/1910 | Heller | 52/712 |
| 1,241,885 | A | * | 10/1917 | Roeder | 52/714 |
| 1,366,470 | A | * | 1/1921 | Lampert | 52/714 |
| 1,474,046 | A | * | 11/1923 | Lampert | 52/714 |
| 1,762,254 | A | * | 6/1930 | Zarba | 52/371 |

(Continued)

FOREIGN PATENT DOCUMENTS

DE    10230737    7/2002

(Continued)

*Primary Examiner*—Carl D. Friedman
*Assistant Examiner*—Gay Ann Spahn
(74) *Attorney, Agent, or Firm*—Horst M. Kasper

(57) ABSTRACT

A fixing bracket is described for joining wooden building components to each other and to a substrate, particularly of the kind used for joining boards used to cover balconies and decks outdoors. It is essential that the fixing bracket is a double angle consisting of two L-sections (2, 2'), having a double web (5) consisting of two section legs (3, 3'), whereby a fixing hole (9, 9') is provided in the angle flanges (8, 8'). In an advantageous manner, the tongue-shaped spikes (6, 6') are arranged near the upper edge of the web and are cut directly out of the web and bent out perpendicularly from the web.

41 Claims, 4 Drawing Sheets

U.S. PATENT DOCUMENTS

Figure 1:
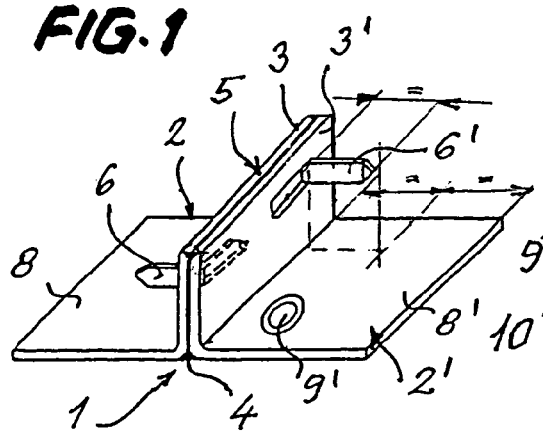

| | | | | |
|---|---|---|---|---|
| 1,783,391 | A * | 12/1930 | Schorr et al. | 52/700 |
| 1,870,011 | A * | 8/1932 | Johnson | 52/720.1 |
| 1,879,457 | A * | 9/1932 | Paulsen | 52/714 |
| 1,922,945 | A * | 8/1933 | Gravert | 52/27 |
| 1,974,259 | A | 9/1934 | Cherry | |
| 2,045,936 | A * | 6/1936 | Wieger | 404/31 |
| 2,066,813 | A * | 1/1937 | Williams | 411/458 |
| 2,116,737 | A * | 5/1938 | Urbain | 52/489.2 |
| 2,129,975 | A * | 9/1938 | Urbain | 52/489.2 |
| 2,216,271 | A * | 10/1940 | Joiner | 52/548 |
| 2,272,762 | A * | 2/1942 | Awbrey | 52/369 |
| 2,447,694 | A * | 8/1948 | Finch | 52/506.09 |
| 2,476,506 | A * | 7/1949 | Olsen | 52/364 |
| 2,620,705 | A * | 12/1952 | Papa et al. | 411/460 |
| 2,848,758 | A * | 8/1958 | Chisholm | 52/364 |
| 2,915,795 | A * | 12/1959 | Kendall | 52/393 |
| 3,089,570 | A * | 5/1963 | O'Neil, Jr. | 52/713 |
| 3,267,624 | A * | 8/1966 | Wozniak et al. | 52/100 |
| 3,276,797 | A * | 10/1966 | Humes Jr. | 52/715 |
| 3,348,346 | A * | 10/1967 | Heim et al. | 52/239 |
| 3,407,547 | A * | 10/1968 | Doke et al. | 52/36.6 |
| 3,476,634 | A * | 11/1969 | Fleischmann | 428/50 |
| 3,553,919 | A * | 1/1971 | Omholt | 52/506.1 |
| 3,565,473 | A * | 2/1971 | Kedel | 52/99 |
| 3,577,694 | A * | 5/1971 | Omholt | 52/506.1 |
| 3,606,414 | A * | 9/1971 | Haley | 52/714 |
| 3,759,001 | A * | 9/1973 | Judkins et al. | 52/241 |
| 3,828,514 | A * | 8/1974 | Jureit | 403/230 |
| 3,875,719 | A * | 4/1975 | Menge | 52/669 |
| 4,157,002 | A * | 6/1979 | Adolph | 52/657 |
| 4,157,676 | A * | 6/1979 | Jureit | 411/458 |
| 4,235,148 | A * | 11/1980 | Menge | 411/466 |
| 4,246,852 | A * | 1/1981 | Werych | 110/336 |
| 4,318,652 | A * | 3/1982 | Gore | 411/468 |
| 4,339,903 | A * | 7/1982 | Menge | 52/657 |
| 4,389,190 | A * | 6/1983 | Sevink | 432/247 |
| 4,479,341 | A * | 10/1984 | Schuplin | 52/665 |
| 4,489,529 | A * | 12/1984 | Ollinger et al. | 52/731.7 |
| 4,498,272 | A * | 2/1985 | Adams | 52/714 |
| 4,503,652 | A * | 3/1985 | Turner | 52/657 |
| 4,553,363 | A * | 11/1985 | Weinar | 52/288.1 |
| 4,558,549 | A * | 12/1985 | See | 52/220.2 |
| 4,616,462 | A * | 10/1986 | Abendroth | 52/509 |
| 4,620,403 | A | 11/1986 | Field | |
| 4,641,474 | A * | 2/1987 | Cannarsa | 52/514 |
| 4,703,601 | A * | 11/1987 | Abendroth | 52/509 |
| 4,711,183 | A * | 12/1987 | Handler et al. | 108/107 |
| 4,712,350 | A * | 12/1987 | Vukmanic | 52/506.07 |
| 4,815,886 | A * | 3/1989 | Madsen | 403/28 |
| 4,925,141 | A * | 5/1990 | Classen | 248/217.2 |
| 4,941,340 | A * | 7/1990 | Nowak et al. | 72/379.2 |
| 5,006,006 | A * | 4/1991 | Lehtonen | 403/283 |
| 5,027,573 | A * | 7/1991 | Commins et al. | 52/489.2 |
| 5,154,536 | A * | 10/1992 | Ciudaj | 404/118 |
| 5,279,091 | A * | 1/1994 | Williams et al. | 52/489.2 |
| 5,454,203 | A * | 10/1995 | Turner | 52/720.1 |
| 5,588,629 | A * | 12/1996 | Barnes | 248/475.1 |
| 5,910,087 | A * | 6/1999 | Carter | 52/371 |
| 5,966,892 | A * | 10/1999 | Platt | 52/712 |
| 5,974,753 | A * | 11/1999 | Hsu | 52/506.01 |
| 6,364,374 | B1 * | 4/2002 | Noone et al. | 285/424 |
| 6,416,269 | B1 * | 7/2002 | Martel et al. | 411/461 |
| 6,490,838 | B2 * | 12/2002 | Summerford | 52/650.3 |

FOREIGN PATENT DOCUMENTS

| | | | |
|---|---|---|---|
| EP | 1407357 | | 7/2002 |
| FR | 1120223 | * | 7/1956 |
| GB | 182872 | * | 6/1922 |
| GB | 1462482 | | 1/1977 |

* cited by examiner

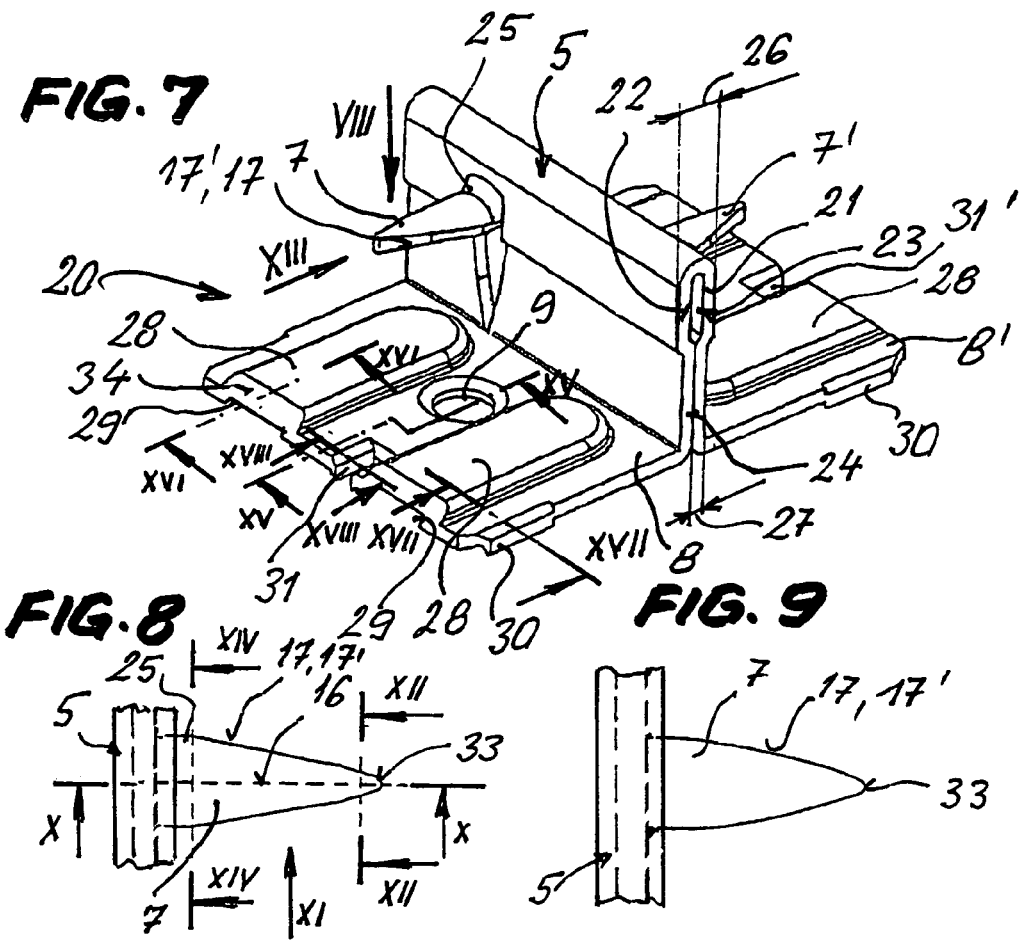

FIXING BRACKET FOR JOINING WOODEN BUILDING COMPONENTS

TECHNICAL AREA

The invention relates to a fixing bracket for joining wooden building components to each other and to a substrate, particularly for joining boards used to cover balconies and decks outdoors, said bracket having a vertical web, at least one tongue-shaped pointed spike projecting horizontally at the top to both sides of the web, and angle flanges projecting perpendicularly/horizontally at the bottom to both sides of the web.

STATE OF THE ART

Joining elements are generally known for wooden components for purposes of affixing two parallel boards onto a substrate to be used outdoors in such a way that, first of all, there is an air gap and a space for the wood to expand and contract between the boards and that secondly, there is likewise an air gap—for air circulation and as a measure against rotting—between the substrate and the boards. Thus, it is common practice to place a spacer batten between the boards in the lengthwise direction and to lay narrow battens underneath the boards as the substrate. The boards are then affixed by means of screws with which the boards are screwed to the substrate, vertically all the way through the support battens. The spacer battens are subsequently removed. Aside from the fact that the screws in the pierced boards are visible from the top, the wood surface is often broken open, so that cracks and protruding splinters are formed. Moisture penetrates via the holes and damages the wood. Children walking barefoot on the wood can easily hurt themselves and weathering causes discoloration around the holes, thereby even further accentuating the already unaesthetic appearance of the screws. Finally, in the case of long boards, the wood becomes enlarged around the screws if the wood and the substrate have different coefficients of linear expansion. In spite of this, it is a method that is still frequently employed since it is the only one that ensures sufficient ventilation space and thus good air circulation, while allowing the use of long spikes. Here, a joint spacing and ground spacing of at least about 5 mm are commonly used.

U.S. Pat. No. 2,116,737 describes a joining system by means of which boards provided with a tongue and groove are affixed to each other and to a substrate. Here, a fixing bracket is used whose vertical web has three claw-like spikes that protrude perpendicularly at the top and that penetrate into the surfaces of the boards. At the bottom of the web, there are two perpendicularly bent angle flanges, each about half as long as the web, that are bent in opposite directions (left/right). For purposes of maintaining the spacing and affixing the boards to the substrate, there is a U-shaped rail that can be screwed onto the substrate and that secures the bracket via lateral web shoulders, whereby the boards lie on the legs of the rail. Thus, there is no direct contact of the bracket with the surface to be joined, and during the assembly, the components have to be held slanted in order to then achieve a wedging under tension, whereby it is not possible to straighten the component with a simple tool, for example, with a hammer. Moreover, the relatively short claws are wide and pointed in design, thus giving rise, on the one hand, to a dynamic pressure, and on the other hand, a wedge effect in the wood, which can lead to crack formation. Furthermore, the claws are formed as a continuation of the top of the web, as a result of which a metal strip of correspondingly greater length has to be used. Finally, these prior-art brackets do not leave any space between the boards, as a result of which no air circulation is possible and no shrinkage is taken into consideration, so that these brackets are not suitable for outdoor use.

U.S. Pat. No. 2,066,813 describes a joining element that is designed in a similar manner to the previously described bracket and that, owing to its longer angle flanges, has support surfaces that allow simpler insertion of the panels and that also have a fixing hole. These joining brackets are configured for fastening wall paneling such as fiberboard and cork panels, and they have blade-like claw spikes that are not very sturdy and that are not suitable for wood. Spacers are not necessary, in fact, they are undesirable, and this is why these brackets cannot be used outdoors.

Finally, U.S. Pat. No. 441,227 describes a joining element that can be used to make corner joints for crates. The bracket here is made of a metal strip in which, as the vertical web, a tongue-shaped angle piece is cut out of the strip and bent upwards perpendicularly. Moreover, in the plate and in the web, there are three corner tongues shaped like spikes that are driven into the boards that are to be joined. These prior-art brackets are not suitable to create a connection whose front surface is not visible from the outside.

TECHNICAL OBJECTIVE

The objective of the invention is to provide a fixing bracket of the type described above that constitutes an inexpensive joining element that is optimally suited for securely laying wooden boards outdoors with appropriate ventilation spacing and that can withstand the high pressing resistance of hardwood and Thermowood, without causing the wood to crack or splinter.

DISCLOSURE OF THE INVENTION AS WELL AS OF ITS ADVANTAGES

This objective is achieved by a fixing bracket of the type described above in that the fixing bracket is a double angle consisting of two L-sections, the web is a double web consisting of two section legs, and at least one fixing hole is provided in at least one of the angle flanges. Advantageous embodiments are described in the subclaims.

Accordingly, the fixing bracket is a double angle consisting of two L-sections and it has an essentially upside-down or prone T-cross section. The fact that the web has a double wall, however, also entails the advantage that the web has increased strength and that the spike of the one wall part is supported by the other wall part, especially when the brackets or spikes are being driven in. Here, the web is a double web made up of two section legs, that is to say, it is double-walled, so that the spacing between the boards is at least two times the thickness of the metal. Moreover, in at least one of the two angle flanges, there is at least one fixing hole through which the brackets—and thus the boards—can be affixed to the substrate.

Of course, the section legs that form the double web can themselves also be doubled legs in that, during the bending of the metal blank to form the L-section, each of the legs that serves as the double web wall during the installation of the sections is doubled by appropriately bending a strip of material so that then, in total, for example, a quadruple web can be obtained. The reinforcement or spacer wall that is bent inwards can fill the entire length and height of the web. However, it can also consist of at least a short lengthwise strip, preferably on the upper one-third of the web, or of several parallel crosswise webs that are preferably to be provided at the height or in the zone of the spike of the other section, in order to optimally withstand the counter-pressure when the spike is driven in.

It is advantageous if the bracket double angle consists of two L-shaped angle sections that are each joined together with a section leg lying flat against each other to form a T-section by means of welding, riveting or joining techniques. In this manner, L-shaped angle irons that have been bent from appropriate metal strips can be joined in a simple manner to form a double angle plate, whereby it is also conceivable to use commercially available sections for this.

It is especially advantageous if the double angle bracket is made from a continuous metal strip by means of bending techniques, that is to say, if it is made from one piece. The double web bent in the middle of the metal plate does not require any further joining measures.

Moreover, it is advantageous if the tongue-shaped spikes are arranged near the upper end of the web and are cut directly out of the web material and bent out perpendicularly so that no additional material width needs to be provided for cutting and shaping the claw-shaped spikes, as is the case with the prior-art brackets. At the same time, the spikes that are bent out of the double web walls can be supported by the wall situated behind each of them and they can be driven into the wood via said wall.

The fixing spikes arranged at both sides of the double web are advantageously configured and arranged in such a way that preferably only one spike is provided for each side of the web, and said spike can be centered relative to the lengthwise extension of the web or positioned off-center in the lengthwise direction, for example, in each case, at the beginning of the outer one-fourth of the web. Here, the two spikes that project freely perpendicularly but in opposite directions from the two web surfaces and also the brackets in their entirety, as will be explained further below, are offset laterally symmetrical relative to a symmetry point located in the middle of the web, that is to say, the bracket sides are each identical when rotated by 180°. Thanks to this point symmetry, the brackets do not have to be specially oriented during the installation work so that automation of the installation could conceivably be carried out, in that the brackets can be fed automatically and installed with hammering or pneumatic driving equipment.

According to the invention, the spikes can be bent out of the double web horizontally or vertically, i.e. parallel or perpendicular relative to the angle flanges. In the case of brackets with a lower web, it will be more advantageous to bend the spikes out horizontally, that is to say, parallel— preferably from the inside to the outside. In the case of higher webs, that is to say, webs whose height is greater than the spike length, the spikes can advantageously be stamped out in the vertical direction, namely, upwards. Moreover, if the fixing spike is particularly advantageously also bent open downwards so as to be gutter-shaped or arch-shaped, also at the root of the spike and tapering towards the tip with a smaller radius at the tip, then the shape of the spike is extremely similar to the upper part of the beak of a bird. Thus, the spike is copied from nature so to speak and is extremely resistant to bending along its entire length.

It is also especially advantageous if there is a bulge in the form of beads at the upper, that is to say, outer part of the double web, running on both sides in the lengthwise directions of the web, said beads together forming a double bead running in the lengthwise direction and thus forming a web head. The spikes protrude from the side surfaces of this web head, which is hollow on the inside. In this manner, a greater width of the web and consequently a greater spacing can be attained between the boards. In this manner, it can be achieved that, with a material thickness of only approximately 1.5 mm, the width of the web head is 5 mm or considerably more, depending on the configuration of the beads. Naturally, this embodiment is possible with the brackets that are welded in two pieces as well as with the brackets that are shaped in one piece.

The web that bears the web head at its top can have a closed web foot, i.e. the two web metal pieces lie tightly against each other. However, the web foot can also be configured so as to be open, whereby the metal pieces are at a distance from each other with an opening gap of at least 0.5 mm. In addition to the good air circulation achieved in this manner, also through the web, the open web foot imparts an optimal elasticity to the bracket, which has a very positive effect in the case of shrinking or swelling processes in the wood, since in this case, the bracket expands and contracts along with the wood so to speak, in other words, it can be elastically compressed or pulled apart.

Since problems could arise as a result of the presence of the hollow web head and of the open web foot when these crosswise-elastic brackets are driven in, it is advantageous if, approximately at the level of the spike, there is an opening in the opposite wall of the web head through which the driving or counter-pressure tool can be inserted. Thus, through this opening, it is possible to drive or exert counter-pressure onto the inside of the wall from which the spike projects.

It is also advantageous if the widths of the angle flanges are substantially greater than the spike length, preferably twice as large or wide, so that the angle flanges extend horizontally a great deal below the spikes. Aside from the resultant good stability of the bracket and the good pressure absorption when the board is subject to a load, the board can be laid onto the free end of the angle flange situated behind the spike, so that said end forms a support as well as a sliding ramp for the board.

The angle flanges here are the same length as the double web, since the bracket is made in its entirety by bending a rectangular metal strip. However, the angle flanges can also be only half the length of the double web, whereby the two half flanges should be arranged so as to be offset, that is to say, to alternately project away from the web. Primarily, these half flanges entail the advantage of saving material, and it is obvious that, in order to provide better access to the flange screw hole, the spikes are each situated on the other half of the web.

It is also especially advantageous if, on each of the angle flanges, there is at least one elevation extending upwards in the direction of the spikes in the form of a bead that runs in the direction of the widthwise extension and that has an arched or roof-like cross section. These elevations serve primarily to raise the support surface of the angle flanges since the boards rest on the surface of these beads. The spacing of the boards relative to the substrate can also be influenced as a function of the height of these spacer beads or support beads, and an optimal air circulation can be achieved. Here, an especially good and secure support of the boards on the angle flanges can be achieved when two beads are provided parallel in the widthwise extension, each adjacent to the outer side edge of the angle flanges. In this manner, the possibility exists to situate the fixing hole in the middle between the two beads.

The hole for the fixing screw is advantageously shaped in such a way that the countersinking angle in the angle flange is greater than the angle of the screw head. As a result, when the board expands or shrinks, the screw head is prevented from tilting and possibly from breaking off. Moreover, it is advantageous if the fixing holes are configured as oblong holes that run crosswise, since this allows weather-induced expanding and contracting of the wood (swelling or shrinking) without being hindered by the screws.

An advantageous safeguard against torsional movement is achieved according to the invention in that the angle flanges create a positive fit with the substrate, namely, in that at least one claw-shaped blade strip that projects downwards has been shaped into or bent out of the angle flanges. These blade strips can be provided on both side edges of the angle flanges, at least on the front face or side end, and over a length of at least one-sixth the width of the flange. When the fixing screws are tightened, these blade strips that project downwards from the angle flanges are pushed into the wood. If the blade strip does not completely penetrate into the wood on the flange side opposite from the screw, e.g. if the wood is very hard, then it is sufficient to hammer it or to step on it from above in order to effectuate the positive fit there as well. For purposes of achieving an especially good grip, there can also be a U-shaped rectangular recess that has a depth of about ¼ the flange width and that is centered relative to the lengthwise extension of the angle flanges, whereby the side edges running in the widthwise extension of the flange are bent out downwards in the form of claw-shaped blade strips.

It is also advantageous if, on the lengthwise sides of the angle flanges, there are ramp-like sliding surfaces that also encompass the optionally present corresponding ends of the beads. Through the shaping of a ramp-like sliding surface on the ends of the angle flanges, parallel to the web, the heavy boards can easily be slid onto the double angle plate in order to be subsequently installed.

It is also advantageous if the two L-sections that form the bracket are independent individual sections that are joined or that can be joined to each other in such a way that they allow at least a slight crosswise shifting of the two sections relative to each other, but not in the lengthwise direction. In this manner, the possibility exists that, in the installed state, the two sections each move together with the board into which they have been driven, that is to say, they shift along with the crosswise shrinking or swelling movements of the boards. However, at the same time, they are joined together by at least one crosswise guide element, specifically in such a way that they can shift crosswise but not lengthwise and not heightwise. Furthermore, if there are also oblong holes extending crosswise and provided in the angle flanges as fixing holes, then an optimal cooperation between the brackets and the boards is ensured.

As crosswise guide elements, there are guide tongues that are cut perpendicularly out of the section webs, that are, at the same time, counter-aligned with the angle flanges, and that can be rectangular, while as guide openings that cooperate with said guide tongues, there are guide segments or guide beads that are worked at the bottoms of the webs and that open crosswise or extend into the angle flanges.

The guide beads here can, at the same time, advantageously be the above-mentioned spacer beads that are coordinated with the tongue dimensions in a version that is open towards the inside of the web and correspondingly adapted, concurrently forming a crosswise tunnel for purposes of optimal circulation. Here, too, in a practical or advantageous manner, a mid-point symmetry of the bracket is to be created or maintained, that is to say, for example, the spikes should each be centered and in alignment with each other, and the guide elements should be arranged correspondingly off-center so as to create bracket sections that are identical. In this way, after pivoting or repositioning the bracket by 180°, there are always bracket sides that are configured identically and, in general, there is no need to figure out which is the left-hand side or right-hand side of the bracket in order to join it correctly to the board because both sides are preferably identical.

Of course, a centered arrangement of the guide elements is also possible and so is an off-centered arrangement of the spikes. However, this calls for different section parts of a bracket since then, for example, one section part would have the centered tongue and the other would have the centered guide cutout.

Finally, on the upper support surfaces of the angle flanges or their guide and/or support beads, there can be at least one, preferably mid-point symmetrical, notch or bulge in the form of a cleat rising at a slant in the direction of the vertical web. These notches or bulges serve to secure the spike from being pulled out of the boards. These cleat-like protuberances should be configured in such a way that their centered tops rise in the direction of the web or run parallel to the angle flange or bead surface, while the bottoms or side cleat cut edges or cut surfaces, which run altogether at a slant, cause the cleats to widen conically towards the web.

Finally, it should still be pointed out that the invention resolves contradictory circumstances or objectives, namely, the contradiction between inexpensive manufacturing (=thin material), large spacing (=thick material), high spike strength (=thick and wide material) and no splinters (=long and thin spikes), and all of this is achieved by the special shaping measures for the bracket elements. In summary, these are the following:

shaping a double angle with a double web out of a thin metal strip, embossing of beads in order to form spacers, both on the web (web head/board spacing) as well as on the angle flanges (support spacing), optionally with an open web foot, special geometry of the spikes, that is to say, the length is about twice the board spacing, with a gutter-like crosswise curvature, a conical-spatial cut edge, cut horizontally or vertically out of the web wall, blade strips protruding from the bottom of the angle flanges, fixing holes with a countersinking angle that is greater than the screw head angle, optionally as crosswise oblong holes, shaping of beveled surfaces at the ends of the angle flanges as a ramp-like sliding aid for the boards, angle flange width about twice as large as the spike length, complete separation of the double angle.

BRIEF DESCRIPTION OF THE DRAWINGS IN WHICH THE FOLLOWING IS SHOWN

Figure 2:
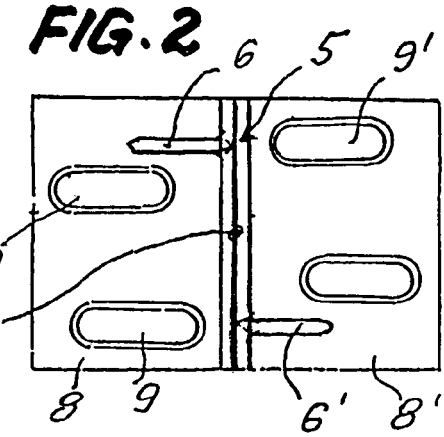
Figure 3:
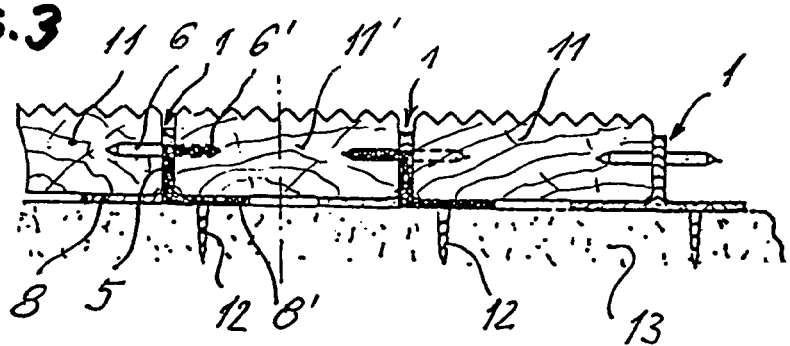
Figure 4:
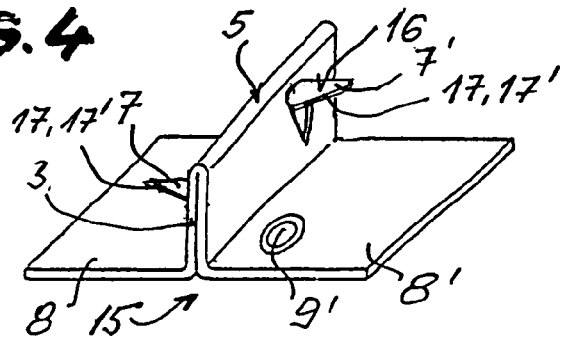
Figure 5:
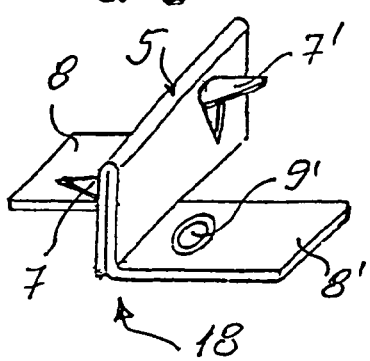
Figure 6:
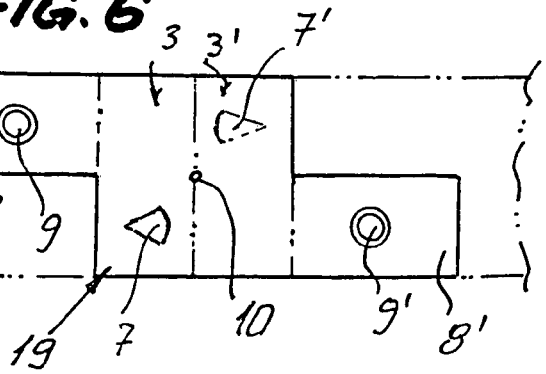
Figure 15:
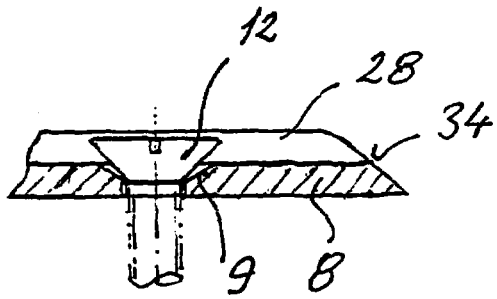
Figure 16:
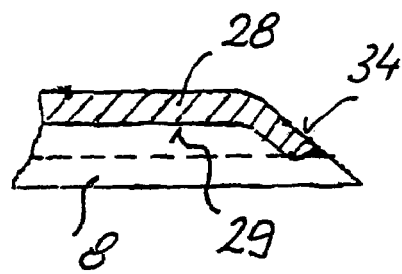
Figure 17:
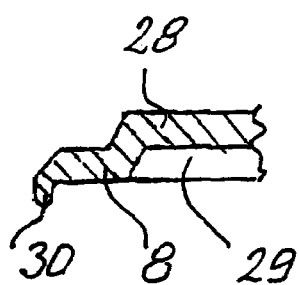
Figure 18:
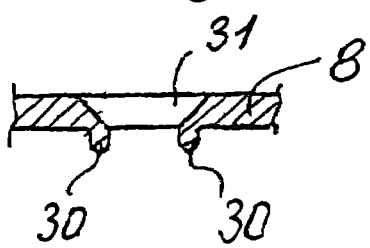
Figure 19:
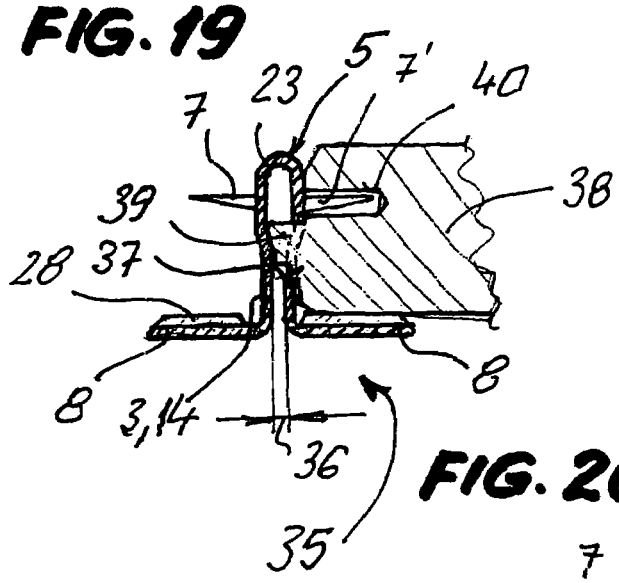
Figure 20:
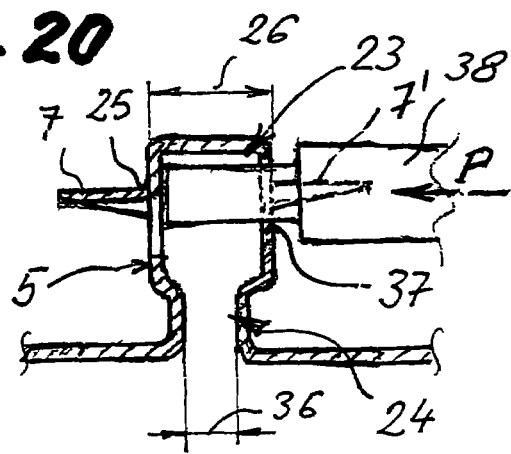
Figure 21:
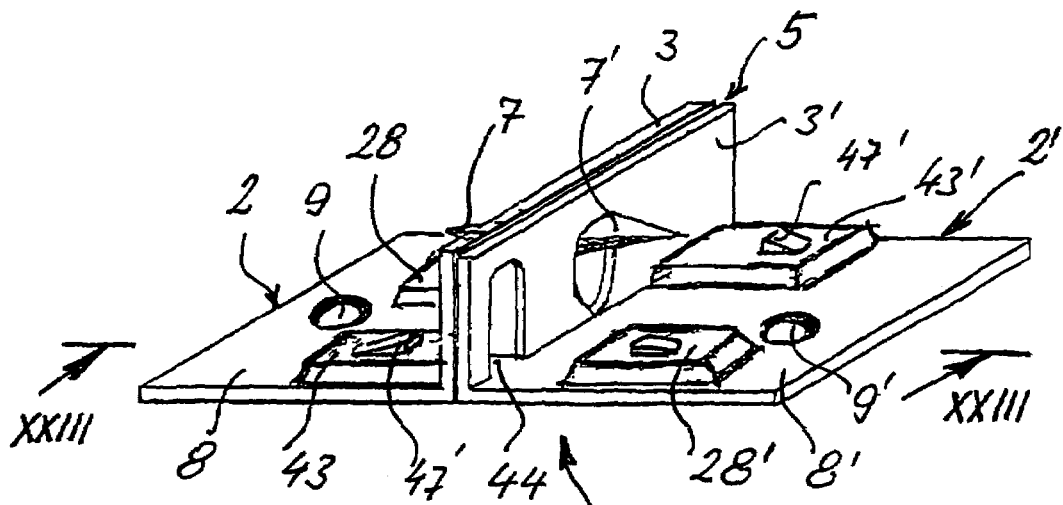
Figure 22:
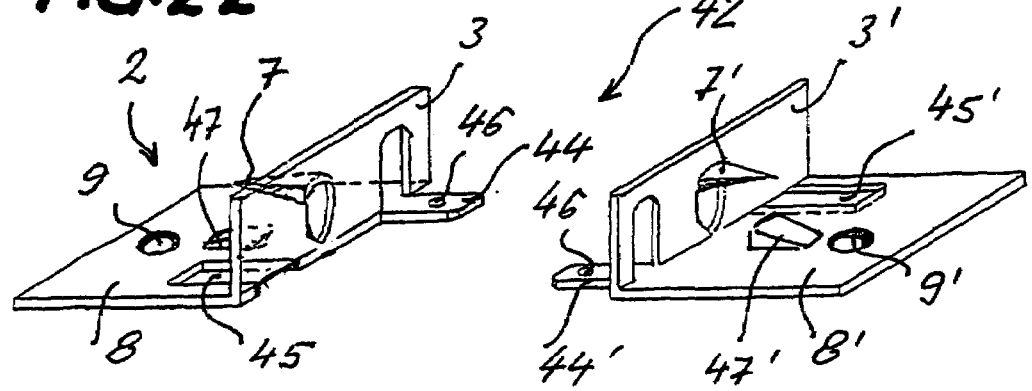
Figure 23:
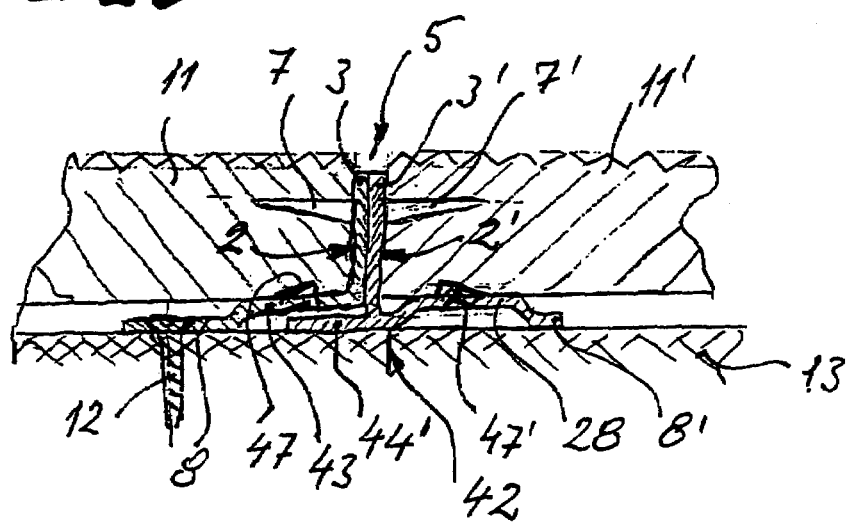

FIG. 1: a perspective view of a fixing bracket in a version with welded-together L-sections and horizontally cut-out spikes, FIG. 2: a top view of the bracket according to FIG. 1, in a version with oblong fixing holes, FIG. 3: a schematic view of several fixing brackets in the mounted state with boards on a substrate, FIG. 4: a perspective view of a fixing bracket in a version with a folded double web and vertically cut-out spikes, FIG. 5: a view similar to that in FIG. 4, only with alternately arranged half angle flanges, FIG. 6: a top view of a metal blank for the fixing bracket according to FIG. 5, FIG. 7: a perspective view of a fixing bracket in a version with spacer beads, FIG. 8: a top view onto a spike along the arrow VIII of FIG. 7, FIG. 9: a top view similar to that of FIG. 8, but with a rounded off flank shape, FIG. 10: an axial section X-X of FIG. 8 through the spike, FIG. 11: a side view along arrow XI of FIG. 8, FIG. 12: a section through the spike tip along lines XII-XII of FIG. 8, FIG. 13: a view of the spike from the front along arrow XIII of FIG. 7, FIG. 14: a section near the spike root along lines XIV-XIV of FIG. 8, FIG. 15: a section along lines XV-XV of FIG. 7, representing the fixing hole countersinking, FIG. 16: a section along lines XVI-XVI of FIG. 7 through a support bead with a bevel, FIG. 17: a section along lines XVII-XVII of FIG. 7, showing the arrangement of the blade strip on one face of the angle flange, FIG. 18: a section XVIII-XVIII of FIG. 7, representing the centered shaping of blade edges, FIG. 19: a cross section through a bracket in a version similar to that of FIG. 7, but with an open web foot and a counter-pressure tool, FIG. 20: a section through a version similar to that of FIG. 19, with a wide, open web and a narrow counter-pressure or driving tool, FIG. 21: a perspective view of the bracket in the fifth version, with two section parts that can be slid crosswise, in the slid-together state, FIG. 22: a view like in FIG. 21, with the sections pulled apart, and FIG. 23: a section XXIII-XXIII through the bracket according to FIG. 21, with installed boards.

WAYS TO EXECUTE THE INVENTION

The embodiment shown in FIG. 1 is a fixing bracket 1 consisting of two L-sections 2, 2', in which the two sections are joined with their vertical legs 3, 3' lying against each other via a weld seam 4 to form a T-section. Here, the welded vertical legs 3, 3' form a vertical web 5 that is especially sturdy due to the double material thickness. Each second leg of the L-sections 2, 2' is in alignment with the other and they each form angle flanges 8, 8' that project horizontally away from the web 5 and via which the bracket rests on a substrate (not shown here). In each of these angle flanges 8, 8', there is a fixing hole 9, 9' for a fixing screw with a conical countersunk head (not shown here). A perpendicularly oriented spike 6 or 6' is cut horizontally out of each leg of the vertical web and the backs 16 of these spikes are each oriented perpendicular away from the web and, at the same time, parallel to the angle flanges 8, 8'. Furthermore, it can be seen that the length of the spikes 6, 6' is only about half as much as the width of the angle flanges 8, 8'. Moreover, it can be seen that the spikes 6, 6' are shaped in such a way that the material doubling, which forms the web 5, is not broken open anywhere on either side. The opening shape for bending out the spikes is such that the spikes can be driven back into this shape, e.g. by being hammered back in using a hammer. This is advantageous for the installation of the first and last board since this avoids the risk of injury due to protruding spikes.

The embodiment shown in FIG. 2 is essentially the same embodiment as in FIG. 1, except that the spikes 6 and 6' are arranged mirror-image with respect to the web and, instead of the two alternately arranged fixing holes 9, 9', there are now two fixing holes 9, 9' for each angle flange 8, 8', and they are configured as oblong holes that run crosswise, as a result of which the boards can expand and contract in the crosswise direction relative to the substrate. The brackets are mounted in such a way that, during average weather conditions, the screws come to lie in the middle of the oblong holes. Moreover, the bracket is designed in such a way that it is configured point-symmetrically to the symmetry point 10 that is centered relative to the web and, at the same time, relative to the entire web, as a result of which the bracket looks exactly the same when it is rotated by 180°.

FIG. 3 shows three fixing brackets 1 with installed boards 11. In this representation, the first bracket from right to left was driven into the left-hand board 11, whereby first of all, the left-hand angle flange 8 served as the support surface, as the spacer and as the guide surface. The affixing of the board 11 starts at the moment when the spike 6 penetrates the board and it ends when the board reaches the web 5 or when the web 5 comes to lie against the board. Then the bracket is screwed by means of the screw 12 into the substrate 13. It goes without saying that several brackets are mounted and affixed at intervals of about 50 cm along the boards. Here, however, we will always speak of only one bracket. Now the next board is put into place from the right, whereby the right-hand angle flange 8' first serves as the support surface, guide surface and spacing plate, and the positive fit starts with the penetration of the metal spike 6'. This process ends once again when the second board 11 reaches the web 5, that is to say, when it comes to lie against it. The assembly now continues in that the left-hand angle flange of the next bracket is slid under the right-hand side of the middle board and the left-hand spike is driven in. This it how it continues until the last board, which then constitutes the end piece.

FIG. 4 shows a fixing bracket 15 that, at first glance, looks similar to the bracket 1 of FIG. 1. The difference can be seen especially in the fact that the bracket 15 was not formed out of two welded-together angles but rather of a continuous metal strip to form a T-section. Moreover, the spikes 7, 7' were not cut out horizontally but rather vertically, that is to say, they were cut out and bent upwards, they have a straight spike back 16 or spike ridge and are bent open downwards in a gutter-like manner and, thanks to this crosswise curvature, they acquire a great stiffness so that, in spite of the great length of the spikes, they can be driven into hard wood. Moreover, they have conical-spatial cut edges 17 or cut surfaces 17' that ensure that the wood does not split open at the edge of the spike. The precise shape of the spike will be described in greater detail below in conjunction with further drawing figures.

FIG. 5 shows a fixing bracket 18 that is fundamentally shaped in the same manner as the bracket 15 of FIG. 4, except that now the angle flanges 8, 8' are not present over the full length but rather they are only half the length and, as in all of the embodiments, said angle flanges are arranged on the bracket mid-point-symmetrically, that is to say, offset by half of their length.

FIG. 6 shows a top view of a metal blank 19 from which the bracket 18 of FIG. 5 is produced by means of appropriate bending or folding. It can be seen that the alternately projecting angle flanges 8, 8' having half the length account for a material savings during the cutting from a metal strip of a certain length from which several bracket blanks are cut out in the lengthwise direction of the strip, and in this process, the flange of one blank fits precisely into the shape of the cutout of the flange of the next blank.

The embodiment shown in FIG. 7 is a fixing bracket 20 (fourth embodiment) that represents a more complex form of the bracket 15 of FIG. 4. In comparison to the latter, on the upper part of the web 5, there are crosswise bulging beads 21 and 22 which together form a hollow web head 23. At the lower end of the web, the two flat metal parts are configured so as to lie flat on each other without a gap, forming a gap-free web foot 24. Furthermore, it should be pointed out that the spikes 7, 7' are cut vertically out of the web walls in such a way that they project perpendicularly from the web foot 24 and, at the same time, parallel to the angle flanges 8, 8', so that the spike feet 25 are situated in the web head flanks/beads.

Moreover, on the front face of the bracket 20, it can be seen that, with a relatively small metal thickness 27 of about 1.5 mm, the width 26 of the web head can be at least 5 mm, that is to say, the ideal minimum distance between the boards. Two support and spacer beads 28 having a U-shaped cross section are worked on the angle flanges 8, 8'. The two support beads 28 run parallel to each other and are at such a distance from each other that a fixing hole 9 is created in the middle between them. Under the support bead 28, there are channels 29 by means of which the ventilation of the substrate is optimized. Finally, on each outer end surface of the angle flanges 8, 8', there are blade strips 30 that are formed by bending down these edge zones and that grip the substrate in the installed state, as can be seen especially in FIG. 17. On the outer lengthwise edges of the angle flanges 8, 8', in the middle, there is also a rectangular recess 31, 31' that has blade strips 30 that run in the widthwise extension and that are formed by appropriately cutting and pressing the sheet metal material downwards, as can be seen especially in FIG. 18.

FIG. 7 also shows that, on the two lengthwise edges of the angle flanges 8, 8', there are ramp-like sliding surfaces 34 that are illustrated more precisely in FIGS. 15 and 16.

In a top view, FIG. 8 shows the shape of a spike 7 with the centered straight back 16, the lateral cut edges 17 and cut surfaces 17' that first run parallel to each other at the height of the spike foot 25, then taper the spike conically and finally end in a rounded-off tip 33.

A similar configuration is also found in the spike 7 shown in FIG. 9, except that here, the spike flanks 17' or the cut edges 17 are not pointed in the form of an angled line but rather as a relatively uniform sweeping curve.

FIG. 10 shows that the spike 7 is vertically bent out of the vertical wall 3' of a double web 5 from the bottom towards the top and that it assumes a precisely perpendicular position so that the spike back 16 has a straight, perpendicular position relative to the web wall 3. It can also be seen that the bottom of the cut surface or cut flank 17' is drawn downwards in the direction of the wall, as a result of which a greater width is created in the zone of the spike foot, resulting in a high overall stiffness of the spike, which can also be seen in FIG. 11, whereby here, the arched widening of the spike, drawn downwards, can also be recognized there.

FIGS. 12, 13, and 14 show the spike 7 in various sections or views and in each case, the curved, gutter-like shape—open towards the bottom—can be seen, with the upper straight spike back 16, the lateral conically, i.e. sharply tapered cut edges 17 or cut surfaces 17' and the centered spike tip 33. Through the enlargement of the angle α in FIG. 12 into the angle β in FIG. 14, and the twisting of the cut surfaces 17' from s at the spike tip to s' at the spike foot, as well as the shifting of the cut surfaces from the spike backs by the quantity "x" (FIG. 14), twisted surfaces are formed from the metal edges or metal flanks.

FIG. 15 shows that the fixing holes 9 in the angle flanges 8 are configured in such a way that their countersinking angle is greater than the screw head angle of the countersunk screw 12, as a result of which, when the board expands or contracts due to weather, the screw head is prevented from tilting and breaking off.

FIG. 16 shows that, by means of the beads 28, an especially high support surface for the boards is achieved on the angle flanges 8, 8', that there is a ventilation channel 29 and that, thanks to the ramp-like sliding surfaces 34, the boards can be much more easily slid onto the flange support surfaces or support beads.

FIG. 17 shows that, on an angle flange side which is provided with a bead 28 on one side that forms a ventilation channel 29 underneath it, the outside or end surface is pressed downwards or deformed in such a way that there is a blade strip 30 whose cross section is claw-like and that works its way into the substrate in response to sufficient vertical pressure.

FIG. 18 shows the recess 31 in the angle flanges 8, 8' whose crosswise edges are pressed downwards in such a way that here, too, blade strips 30 are formed that likewise work their way into the substrate in a claw-like manner.

FIG. 19 shows a cross section of a bracket 35 (fifth embodiment), whereby this bracket is configured essentially like the bracket 20 according to FIG. 7, except that here the web foot 24 is open and the spikes 7, 7' are arranged in the middle of the web, that is to say, in alignment with each other. The web foot opening 36 is at least approximately 0.5 mm so that this opening, together with the hollow space of the web head 23, forms a ventilation channel, as a result of which the boards and the board substrate can be optimally ventilated. Since the hollow web head and the opening 36 also impart the bracket with a crosswise elasticity, which means that the bracket cannot be optimally driven into a board, there is an opening 37 provided on the opposite wall 14 across from the driving spike 7. The mandrel of a driving tool 38 penetrates through this opening 37 in such a way that the end face of the tool rests against or exerts counter-pressure on the rear of the wall from which the spike 7 protrudes that has to be driven, and said tool transmits the driving force directly via the wall to the spike 7. It can be seen that, when both spikes 7, 7' are centered, that is to say, in alignment with each other, on the one hand, the tool 38 goes underneath the spike 7' via the mandrel 39 and on the other hand, said tool 38 has a recess 40 on its end face into which the spike 7' projects.

Furthermore, FIG. 20 shows a version that is similar to that of FIG. 19, except that here the web 5 is very open, in other words, it has a large width 26 of the web head and a large web foot opening 36. Since with the embodiment shown here, the spikes 7, 7' are not centered so as to be in alignment, but rather they are in a version that is staggered in the lengthwise direction as described and shown above (point symmetry), the opening 37 can also be made at the same height as the spike 7 so that the driving tool 38 with its mandrel 39 acts precisely on the spike foot 25 of the spike 7 so as to support it or drive it in.

FIG. 21, as the fifth embodiment of the invention, shows a fixing bracket 42 that—like the bracket embodiments described above—is made up of two L-sections and that likewise has a mid-point symmetry so that here, too, installation work can start at the left side or at the right side. The special feature of this embodiment is that the two L-sections are no longer permanently attached to each other but rather are merely loose individual sections that are slid together in pairs so as to cooperate by means of a positive fit, thus forming a bracket unit. The two identical bracket sections 2, 2' each have a spike 7, 7' in the middle of the vertical legs 3, 3', which form the double web 5 in the installed state shown in FIG. 21, and said spikes 7, 7' are thus arranged in the cross-wise direction in alignment with each other; their configuration was already described in depth above. Of course, here, too, in the section legs 3, 3' that form the web walls, there can be a lengthwise bead that forms a web head for purposes of achieving a widened configuration of the double web 5 in the installed state. It can be seen that support beads 28, 28' and guide beads 43, 43' are provided in the angle flanges 8, 8'. In the guide beads, which are open at least in the flange thickness towards the inside of the legs, a guide tongue 44, 44' extends horizontally so as to be able to shift crosswise, as can also be seen more clearly in FIG. 23. The guide tongues are formed by cutting out and bending by 90° until they are in alignment with each of the angle flanges. Each of the flanges 8, 8' also has a fixing hole 9, 9' that can also be configured as a crosswise oblong hole. Furthermore, on each of the beads 28 and 43, there is a vertically protruding notch or bulge 47, 47' that serves to increase the pull-out resistance of the boards in the installed state. The tops of the notches are configured so as to rise at a slant in the direction of the vertical legs 3, 3'; however, they can also be configured so as to be parallel to the support surface and can widen conically in the direction of the vertical legs. On each angle section, there are two notches, namely, in a symmetrical arrangement with respect to the spikes 7, 7'.

FIG. 22 shows the fixing bracket 42 from FIG. 21, but with the angle sections 2, 2' that form the bracket in the state where they are slid apart in the crosswise direction. Here, one can particularly clearly see the shaping of the guide tongues 44, 44' which has been carried out by means of cutting out and bending out in the direction opposite to the appertaining angle flanges 8, 8'. As the second guide elements that cooperate with the guide tongues, there are no guide beads as is the case in FIG. 21 but rather simple rectangular guide cutouts 45, 45'. All in all, it can be seen that the two angle sections 2, 2' are identical, which entails major advantages during the production as well as during the installation. Moreover, in each of the tongues 44, 44', there is a fixing hole 46, 46' that also allows the use of the angle sections as beginning pieces and as end pieces. In the angle flanges 8, 8', there are also notches 47, 47', namely, essentially centered under the spike 7, 7'.

Finally, FIG. 23 shows brackets 42 with boards 11, 11' positioned and installed on a substrate 13. It can be seen how the boards 11, 11' lie on the beads 43 and 28 with the driven-in spikes 7, 7', and the notches 47, 47' are pressed into the bottom of the board. Here, the guide tongue 44 of the right-hand angle section 2' extends into the guide opening of the guide bead 43 of the left-hand angle section 2.

During the installation, the two angle sections 2, 2' are slid together by means of the guide tongues and installed as a unit. In this process, an free-standing pressing block placed against the inside of the web formed by the two vertical angle sections 2, 2' at the place where the spike is, after which the hammer or pressing tool carries out the installation. The assembly work can be carried out equally well either from the left or from the right. After an angle section 2, 2' is pressed into place, the second angle plate is attached to the substrate 13, for example, with a screw 12. Then the next board is placed on the free spike and hammered or pressed into place. Now this procedure is repeated.

If, for example, the board shrinks, then the guide elements shift relative to each other, that is to say, the guide tongues slide in the guide segments or guide beads. The vertical legs of the angle sections remain securely joined to the boards as a result of the hammered-in spikes and of their pull-out resistance. FIG. 23 also shows that the distance of the boards from each other and to the substrate can be adjusted to the required dimension by means of the thickness of the material and of the shaped-in beads.

COMMERCIAL APPLICABILITY

The subject matter of the invention can be used commercially in the construction industry to join wooden building components to each other and to a substrate, particularly boards used to cover balconies and decks outdoors, or beams.

LIST OF REFERENCE NUMERALS

1 fixing bracket, first embodiment
2, 2' L-sections
3, 3' vertical leg
4 weld seam
5 web
6, 6' spike, horizontal
7, 7' spike, vertical
8, 8' angle flange
9, 9' fixing hole
10 symmetry point
11 boards
12 screws
13 substrate
14 - - -
15 fixing bracket, second embodiment
16 back
17 cut edges
17' cut surface/cut flank
18 fixing bracket, third embodiment
19 metal blank
20 fixing bracket, fourth embodiment
21 bead
22 bead
23 web head
24 web foot
25 spike foot
26 wide web head
27 metal thickness
28, 28' support beads
29 channel
30 blade strip
31, 31' recess
32 - - -
33 spike tip
34 ramp-like sliding surfaces
35 fixing bracket, fifth embodiment
36 web foot opening
37 insertion opening
38 driving tool
39 mandrel
40 recess
- - -
42 fixing bracket, fifth embodiment
43 guide bead
44 guide tongue 45 guide segment
46, 46' fixing hole
47, 47' notch/bulge

The invention claimed is:

1. A fixing bracket for joining wooden building components to each other and to a substrate, said bracket comprising:
   a first section leg (3);
   a second section leg (3'), wherein the first vertical web section leg (3) is disposed adjacent to and contacting the second section leg (3'), and wherein the first section leg (3) and the second section leg (3') form a web (5);
   a first angle flange (8) projecting perpendicularly outwardly at the bottom from a side of the first section leg (3) disposed remote from the second section leg (3');
   a second angle flange (8') projecting perpendicularly outwardly at the bottom from a side of the second section leg (3') disposed remote from the first section leg (3);
   wherein the first section leg (3) and the first angle flange (8) form a first L-section (2);
   wherein the second section leg (3') and the second angle flange (8') form a second L-section (2');
   wherein the first L-section (2) and the second L-section (2') combined form the fixing bracket (1, 15, 18, 20, 35, 42) as a double angle;
   a first fixing hole (9) furnished in the first angle flange (8);
   a second fixing hole (9') furnished in the second angle flange (8');
   a first essentially triangular pointed spike (6 or 7) projecting perpendicularly outwardly at the top of a first opening of the first section leg (3) from the side of the first section leg (3) disposed remote relative to the second section leg (3'); and
   a second essentially triangular pointed spike (6' or 7') projecting perpendicularly outwardly at the top of a second opening of the second section leg (3') from the side of the second section leg (3') disposed remote from the first section leg (3).

2. The fixing bracket according to claim 1, wherein the first and second section legs (3, 3') of the first and second L-sections (2, 2') are joined together via a technigue selected from a group consisting of welding, riveting, and joining so that back surfaces of the first and second section legs (3, 3') are flat against each other in order for the fixing bracket to form an upside-down T-shaped cross-section.

3. The fixing bracket according to claim 1, wherein the fixing bracket (15, 18, 20, 35) is bent from a continuous metal strip so as to have an upside-down T-shaped cross-section.

4. The fixing bracket according to claim 1, wherein:
   the first spike (6 or 7) is arranged within an upper third of the first section leg (3) and is formed out of the first section leg (3) and projects perpendicularly from said first section leg (3); and
   the second spike (6' or 7') is arranged within an upper third of the second section leg (3') and is formed out of the second section leg (3') and projects perpendicularly from said second section leg (3').

5. The fixing bracket according to claim 4, wherein:
   the first spike (6 or 7) is arranged so as to be either centered or offset from the center (10) of a length of the first section leg (3); and
   wherein the second spike (6' or 7') is arranged so as to be either centered or offset from the center (10) of a length of the second section leg (3').

6. The fixing bracket according to claim 4, wherein:
   the first spike (6 or 7) is formed out of the first section leg (3) either horizontally or vertically, so as to be either parallel or perpendicular, respectively, relative to the first angle flange (8); and
   the second spike (6' or 7') is formed out of the second section leg (3') either horizontally or vertically, so as to be either parallel or perpendicular, respectively, relative to the second angle flange (8').

7. The fixing bracket according to claim 4, wherein both of the first spikes (6 or 7) and the second spikes (66' or 7') are curved so as to be arc-shaped, and have a spike foot (25) which tapers toward a tip (33) and having a smaller radius at the tip (33) so that either side edges and cut edges (17) or each of the cut surfaces (17') between the spike foot (25) and the tip (33) undergo a spatial curving or twisting relative to the vertical, from about 45° at the spike foot to about 0° at the spike tip (33).

8. The fixing bracket according to claim 1, further comprising a web head (23) formed from first and second beads (21, 22) at an upper outer part of the first and second leg sections (3, 3') of the web (5), said first and second beads (21, 22) running along the length of both of the first and second section legs (3, 3') so that said web head (23) is a hollow double bead from which the first and second spikes (6, 6' or 7, 7') protrude.

9. The fixing bracket according to claim 8, wherein when a material thickness is approximately 1.5 mm, a width (26) of the web head (23) is at least 5 mm.

10. The fixing bracket according to claim 8, further comprising a web foot (24) which is closed due to the first and second section legs (3, 3') being disposed adjacent to and contacting each other.

11. The fixing bracket according to claim 10, wherein at least the spike feet (25) of the spikes (7, 7') are arranged on the web head (23).

12. The fixing bracket according to claim 1, wherein a width of either of the first and second angle flanges (8, 8') is greater than a length of either of the first and second spikes (6, 6' or 7, 7').

13. The fixing bracket according to claim 1, wherein the first and second angle flanges (8, 8') are either the same length as the web (5) or only half the length of the web (5), such that when the first and second angle flanges (8, 8') are only of half the length of the web (5), the first and second angle flanges (8, 8') are arranged so as to be offset from each other by being alternately projecting in mid-point symmetry.

14. The fixing bracket according to claim 1, wherein each of the first and second angle flanges (8, 8') has at least one elevation formed by a support bead (28) that runs crosswise or in the direction of a widthwise extension extending upwardly in a direction of the first and second spikes (6, 6' or 7, 7'), whereby the beads (28) can have a cross-section selected from of a group consisting of an arched cross-section, an roof-shaped cross-section, and a U-shaped cross-section.

15. The fixing bracket according to claim 14, wherein each of said first and second angle flanges (8, 8') have first and second support beads (28) spaced parallel to each other such that the first and second fixing holes (9, 9') are located in the middle between the support beads on the first and second angle flanges (8, 8'), respectively.

16. The fixing bracket according to claim 1, wherein each of the first and second fixing holes (9, 9') is conically countersunk in order to at least partially accommodate a conical head of a countersunk screw (12) and a countersinking angle of the first and second fixing holes (9, 9') is greater than an angle of the conical head of the countersunk screw.

17. The fixing bracket according to claim 1, wherein each of the first and second fixing holes (9, 9') are oblong holes extending in a widthwise direction of the first and second angle flanges (8, 8'), respectively.

18. The fixing bracket according to claim 15, wherein on lengthwise sides of each of the first and second angle flanges (8, 8'), there are ramp-shaped sliding surfaces (34) that encompass corresponding ends of the first and second support beads (28).

19. The fixing bracket according to claim 1, wherein at least one claw-shaped blade strip (30) that projects downwardly has been either shaped into or bent out of each of the first and second angle flanges (8, 8').

20. The fixing bracket according to claim 19, wherein the blade strips (30) are provided on both side edges of the first and second angle flanges (8, 8') such that the blade strips (30) are present at least on the front end, and over a length of at least one-sixth the width of each of the first and second angle flanges (8, 8').

21. The fixing bracket according to claim 19, wherein:
each of the first and second angle flanges (8, 8') has a middle zone having an essentially U-shaped rectangular recess (31) with a depth of about one-fourth the width of one of the first and second angle flanges (8, 8'); and
each of the first and second angle flanges (8, 8') have left and right side edges with the claw-shaped blade strips (30) bent downwardly and running along the crosswise extension thereof.

22. The fixing bracket according to claim 1, wherein the first and second L-sections (2, 2') can be put together or joined to each other to form the fixing bracket in such a way that, through a positive fitting engagement of the first and second L-sections with each other, at least a slight crosswise shifting of the first and second L-sections is possible relative to each other, but not in the lengthwise direction.

23. The fixing bracket according to claim 22, wherein in order to achieve the positive fitting engagement of the first and second L-sections (2, 2'), the first and second L-sections (2, 2') are each provided with crosswise guide elements (43, 44, 45) including a guide tongue (44) projecting from the web (5) and a guide opening (43 or 45) in alignment with the guide tongue (44) and provided in the opposite one of the first and second L-section (2, 2').

24. The fixing bracket according to claim 23, wherein the guide tongues (44) are cut out of the first and second section legs (3, 3'), the guide tongues (44) being rectangularly shaped so as to project perpendicularly outwardly from said first and second section legs (3, 3') and, at the same time, to be in alignment with the first and second angle flanges (8, 8'), while the guide openings (43 or 45) are either cutouts (45) or guide beads (43) that pass correspondingly crosswise through one of the first and second section legs (3, 3') and extend into the first and second angle flanges (8, 8').

25. The fixing bracket according to claim 23, wherein the first and second spikes (6, 6' or 7, 7') are provided on the first and second L-sections (2, 2'), respectively, and are centered on the first and second section legs (3, 3'), respectively, while the guide tongues (44) and the guide openings (43 or 45) are located off-center.

26. The fixing bracket according to claim 24, further comprising at least one bulge of notch (47, 47') in board support surfaces of the first and second angle flanges (8, 8') or the guide beads (43), the at least one vertically upright bulge or notch (47, 47') projecting upwardly, whereby the bulge or notch (47, 47') has a slant in the direction of the web (5) or a top of the bulge or notch (47, 47') is parallel to the board support surfaces of either the first and second angle flanges 98, 8') or the guide beads 43 and a bottom of the bulge or notch (47, 47') widens conically in a direction toward the web (5).

27. The fixing bracket according to claim 1, wherein:
the first section leg (3) has a first inwardly disposed side located contacting a second inwardly disposed side of the second section leg (3');
wherein a first edge of the first section leg (3), disposed remote from the first angle flange (8), joins a second edge of the second section leg (3') in forming a common bent edge; and
the fixing bracket is formed from a continuous metal strip into an upside-down T-shaped cross-section.

28. The fixing bracket according to claim 1, wherein:
the first spike (6 or 7, 7') is disposed in the upper half of the first section leg (3);
the first spike (6 or 7) is disposed parallel to the first angle flange (8);
the first spike (6 or 7) is bent off the first section leg (3) around a first edge disposed parallel to a third edge around which the first angle flange (8) is bent off the first section leg (3) and is bent off in the same bending direction as the first angle flange (8) is bent off from the first section leg (3) forms a first edge with the first section leg (3) in a parallel angular sense as does the first angle flange (8) with the first section leg (3);
the second spike (6' or 7') is disposed in the upper half of the second section leg (3');
the second spike (6' or 7') is disposed parallel to the second angle flange (8'); and
the second spike (6' or 7') is bent off the second section leg (3') around a second edge disposed parallel to a fourth edge around which the second angle flange (8') is bent off the second section leg (3') and is bent off in the same bending direction as the second angle flange (8') is bent off from the second section leg (3').

29. A fixing bracket for joining wooden building components to each other and to a substrate comprising:
a first flat section leg (3);
a second flat section leg (3') disposed immediately adjacent and contiguous to the first flat section leg (3) and having a bent edge in common with the first flat section leg (3), wherein the first flat section leg (3) and the second flat section leg (3') form a vertical web (5);
a first essentially triangular pointed spike (6 or 7) projecting perpendicularly to the first flat section leg (3) away from the second fiat section leg (3');
a second essentially triangular pointed spike (6' or 7') projecting perpendicularly to the second flat section leg (3') away from the first flat section leg (3');
a first angle flange (8) projecting perpendicularly at the bottom of the first flat section leg (3) to the same side as the first spike (6 or 7);
a second angle flange (8') projecting perpendicularly at the bottom of the second flat section leg (3') to the same side as the second spike (6' or 7');
a first fixing hole (9) provided in the first angle flange (8); and
a second fixing hole (9') provided in the second angle flange (8');
wherein the first flat section leg (3) and the first angle flange (8) form a first L-section (2);
wherein the second flat section leg (3') and the second angle flange (8') form a second L-section (2'); and wherein the first L-section (2) and the second L-section (2') are combined to form the fixing bracket (1, 15, 18, 20, 35, 42) as a double angle.

30. The fixing bracket according to claim 29, wherein the first and second L-sections (2, 2') are connected to each other so that the first and second section legs (3, 3') abut each other, the first and second L-sections (2, 2') thus forming an upside down T-shaped cross-section, wherein the first section leg (3) is connected to the second section leg (3') via a technique selected from the group consisting of welding, riveting, and joining.

31. The fixing bracket according to claim 29, wherein the bracket (15, 18, 20, 35) is bent from a continuous metal strip so as to have an upside-down T-shaped cross-section.

32. The fixing bracket according to claim 29, wherein the first spike (6 or 7) is arranged within an upper third of the first flat section leg (3), is formed out of the first flat section leg (3), and projects perpendicularly to said first flat section leg (3); and wherein the second spike (6' or 7') is arranged within an upper third of the second flat section leg (3'), is formed out of the second flat section leg (3'), and projects perpendicularly to said second flat section leg (3').

33. The fixing bracket according to claim 32, wherein the first spike (6 or 7) is on a first side of the web (5), wherein the second spike (6' or 7') is on a second side of the web (5), wherein the first spike (6 or 7) is arranged centered or offset from a center (10) of a length of the first flat section leg (3); and wherein the second spike (6' or 7') is arranged centered or offset from the center (10) a length of the second flat section leg (3').

34. The fixing bracket according to claim 32, wherein the first spike (6 or 7) is cut out of the first flat section leg (3) and is bent upwardly in a vertical direction, and formed parallel to the first angle flange (8); and wherein the second spike (6' or 7') is cut out of the second flat section leg (3') and is bent upwardly in a vertical direction, and formed parallel to the second angle flange (8').

35. The fixing bracket according to claim 29, wherein the width of the first angle flange (8) is greater than the length of the first spike (6 or 7); and wherein the width of the second angle flange (8') is greater than the length of the second spike (6' or 7').

36. The fixing bracket according to claim 29, wherein:
the first angle flange (8) is wider than the first flat section leg (3);
the second angle flange (8') is wider than the second flat section leg (3');
the fixing bracket is subdivided into a forward half and a rearward half;
the first flat section leg (3) is subdivided into a forward half and a rearward half;
the second flat section leg (3') is subdivided into a forward half and a rearward half;
the first angle flange (8) is subdivided into a forward half and a rearward half,
the second angle flange (8') is subdivided into a forward half and a rearward half;
the first spike (6 or 7) is disposed in the forward half of the first flat section leg (3);
the second spike (6' or 7') is disposed in the rearward half of the second flat section leg (3');
the first fixing hole (9) is disposed in the rearward half of the first angle flange (8); and the second fixing hole (9') is disposed in the forward half of the second angle flange (8').

37. The fixing bracket according to claim 29, wherein:
the first spike (6 or 7) has a straight spike back (16) and is bent open from a downwards located point and based on a curvature, the first spike (6 or 7) exhibits a great strength so that, in spite of a projection of the first spike (6 or 7), the first spike (6 or 7) is adapted to be driven into hard wood, and the first spike (6 or 7) has conical spatial cut edges (17) or cut surfaces (17') for ensuring that wood does not split open at the edge of the first spike (6 or 7); and the second spike (6' or 7') has a straight spike back (16) and is bent open from a downwards located point and based on a curvature, the second spike (6' or 7') exhibits a great strength so that, in spite of a projection of the second spike (6' or 7'), the second spike (6' or 7') is adapted to be driven into hard wood, and the second spike (6' or 7') has conical spatial cut edges (17) or cut surfaces (17') for ensuring that wood does not split open at the edge of the second spike (6' or 7').

38. The fixing bracket according to claim 29, wherein:
the first spike (6 or 7) is disposed substantially parallel to the first angle flange (8);
the first spike (6 or 7) is held from above on the first section leg (3);
the first angle flange (8) is held from above on the first section leg (3);
there is a right angle between the first section leg (3) and the first spike (6 or 7);
there is a right angle between the first section leg (3) and the first angle flange (8);
the second spike (6' or 7') is disposed substantially parallel to the second angle flange (8');
the second spike (6' or 7') is held from above on the second section leg (3');
the second angle flange (8') is held from above on the second section leg (3');
there is a right angle between the second section leg (3') and the second spike (6' or 7'); and
there is a right angle between the second section leg (3') and the second angle flange (8').

39. A fixing bracket for joining wooden building components to each other and to a substrate comprising:
a first section leg (3);
a second section leg (3'), wherein the first section leg (3) is disposed immediately adjacent to and abutting the second section leg (3'), and wherein the first section leg (3) and the second section leg (3') form a web (5);
a first angle flange (8) projecting perpendicularly outwardly at the bottom from a side of the first section leg (3) disposed remote from the second section leg (3');
a second angle flange (8') projecting perpendicularly outwardly at the bottom from a side of the second section leg (3') disposed remote from the first section leg (3);
wherein the first section leg (3) and the first angle flange (8) form a first L-section (2);
wherein the second section leg (3') and the second angle flange (8') form a second L-section (2');
wherein the first L-section (2) and the second L-section (2') combined form the fixing bracket (1, 15, 18, 20, 35, 42) as a double angle;
a first fixing hole (9) furnished in the first angle flange (8);
a second fixing hole (9') furnished in the second angle flange (8');

a first essentially triangular pointed spike (6 or 7) projecting perpendicularly outwardly at the top from the side of the first section leg (3) disposed remote relative to the second section leg (3');

a second essentially triangular pointed spike (6' or 7') projecting perpendicularly outwardly at the top from the side of the second section leg (3') disposed remote from the first vertical web section leg (3).

40. A fixing bracket for joining wooden building components to each other and to a substrate comprising:

a first flat section leg (3);

a second flat section leg (3') disposed immediately adjacent to and contiguous the first flat section leg (3) and having a bent edge in common with the first flat section leg (3), wherein the first flat section leg (3) and the second flat section leg (3') form a vertical web (5);

a first essentially triangular pointed spike (6 or 7, 7') projecting perpendicularly to the first flat section leg (3) away from the second flat section leg (3');

a second essentially triangular pointed spike (6' or 7') projecting perpendicularly to the second flat section leg (3') away from the first flat section leg (3);

a first angle flange (8) projecting perpendicularly at the bottom of the first flat section leg (3) to the same side as the first spike (6 or 7);

a second angle flange (8') projecting perpendicularly at the bottom of the second flat section leg (3') to the same side as the second spike (6' or 7');

a first fixing hole (9, 9') provided in the first angle flange (8); and a second fixing hole (9') provided in the second angle flange (8');

wherein the first flat section leg (3) and the first angle flange (8) form a first L-section (2);

wherein the second flat section leg (3') and the second angle flange (8') form a second L-section (2'); and wherein the first L-section (2) and the second L-section (2) are combined to form the fixing bracket (1, 15, 18, 20, 35, 42) as a double angle.

41. A fixing bracket for joining ends of planar wooden building components to each other and to the ground, said bracket comprising:

a first section leg (3);

a second section leg (3'), wherein the first section leg (3) is disposed adjacent to the second section leg (3'), and wherein the first section leg (3) and the second section leg (3') form a web (5);

a first angle flange (8) projecting perpendicularly outwardly at the bottom from a side of the first section leg (3) disposed remote from the second section leg (3');

a second angle flange (8') projecting perpendicularly outwardly at the bottom from a side of the second section leg (3') disposed remote from the first section leg (3);

wherein the first section leg (3) and the first angle flange (8) form a first L-section (2);

wherein the second section leg (3') and the second angle flange (8') form a second L-section (2');

wherein the first L-section (2) and the second L-section (2') combined form the fixing bracket (1, 15, 18, 20, 35, 42) as a double angle;

a first fixing hole (9) furnished in the first angle flange (8, 8');

a second fixing hole (9') furnished in the second angle flange (8');

wherein the web (5) has a length of less than the height of the planar wooden building components perpendicular to the first angle flange (8) and to the second angle flange (8);

wherein a first strip (6 or 7, 7') is drawn out from the side of the first section leg (3) and is bent out projecting perpendicularly outwardly at the top from the side of the first section leg (3) disposed remote relative to the second section leg (3');

wherein a second strip (6' or 7') is drawn out from the side of the second section leg (3') and is bent out projecting perpendicularly outwardly at the top from the side of the second section leg (3') disposed remote relative to the first section leg (3);

wherein ends of said first strip (6 or 7) and said second strip (6' or 7') are disposed remote from the second section leg (3') and the first section leg (3), respectively, and are pointed to form first spikes (6 or 7) or second spikes (6' or 7'), respectively, in order to join the ends of the planar wooden building components via the first and second spikes of the fixing bracket being driven into in the ends of the planar wooden building components which are located adjacent each other;

wherein the planar wooden building components are supported by the first angle flange (8) and by the second angle flange (8') fixable on the ground simultaneously; and wherein the web (5) is arranged perpendicular to a surface formed by the planar wooden building components, once joined, and remains below said surface.

* * * * *